J. P. COONLEY.
Corn-Planter.
No. 24,993. Patented Aug. 9, 1859.
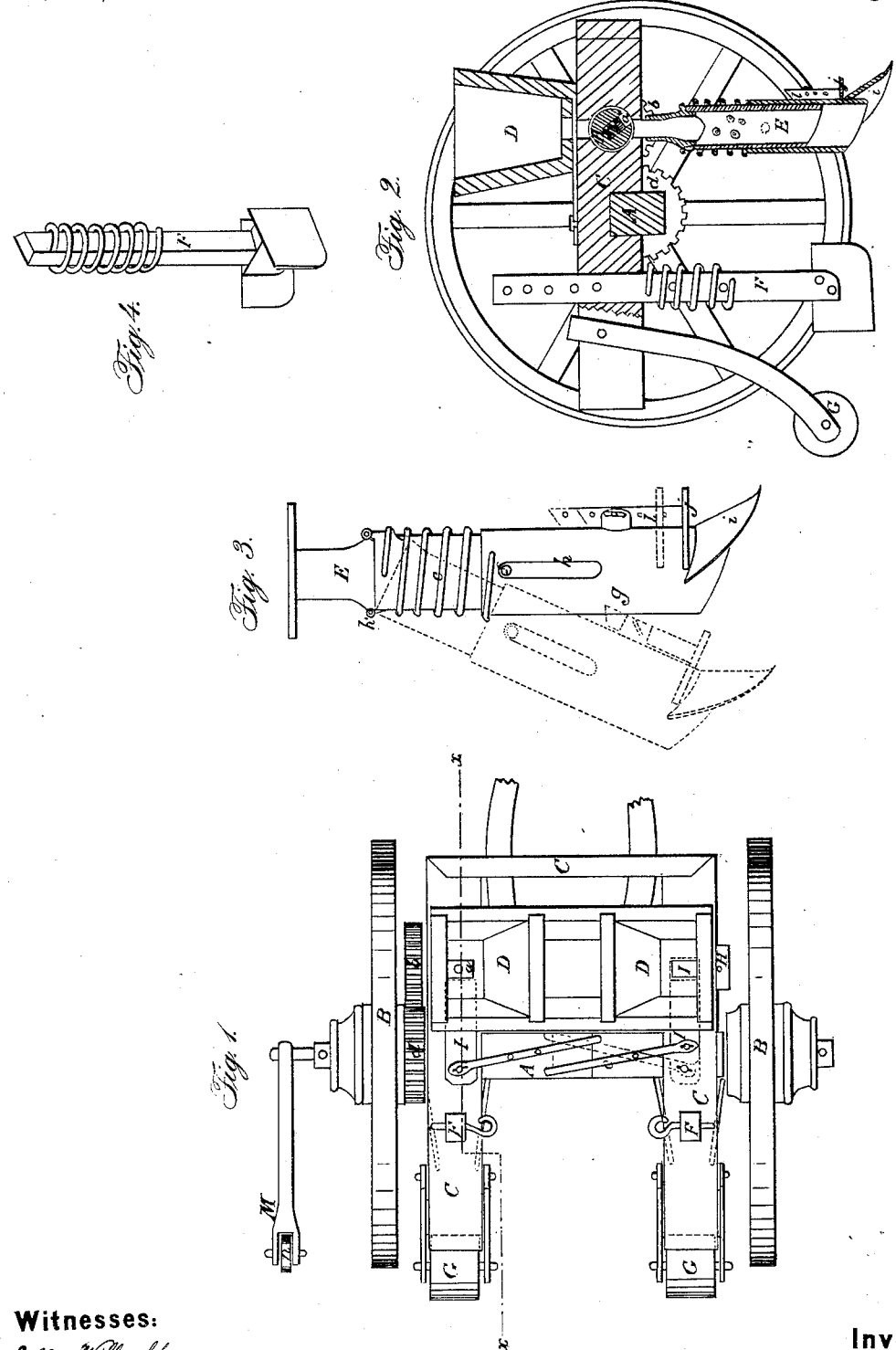
Witnesses:
Ellen Willoughby
Andrew C Hibbed
Inventor:
Jas. P. Coonley

UNITED STATES PATENT OFFICE.

JAMES P. COONLEY, OF FARMINGTON, MICHIGAN.

IMPROVEMENT IN CORN-PLANTERS.

Specification forming part of Letters Patent No. 24,993, dated August 9, 1859.

*To all whom it may concern:*

Be it known that I, JAMES P. COONLEY, of Farmington, in the county of Oakland and State of Michigan, have invented a new and Improved Corn-Planter; and I do hereby declare that the following is a full and exact description thereof, reference being had to the accompanying drawings, making part of this specification—

Figure 1 being a plan view thereof; Fig. 2, a vertical section on the line $x\,x$ of Fig. 1; Fig. 3, an elevation of one of the teeth detached; Fig. 4, a perspective view of one of the adjustable spring-covers.

Like letters designate corresponding parts in all the figures.

As represented in the drawings A is the axle of a pair of truck-wheels, B B, and C a frame attached thereto for supporting the seed-boxes D D and the teeth E, covers F, and rollers G. The seed-boxes have apertures in the bottom, through which the kernels enter the cells $a$ of the seeding or drop roller H, which extends from side to side of the frame, and the dropping-holes are arranged at a proper distance apart for the planting of two rows at a time.

A slide-plate, I, is provided to each hopper, to regulate the size of the opening through which the grain passes, and which also serves as the striker to separate the kernels for each hill from the grain in the hopper. These plates are moved by the levers $c\,c$ to adjust the openings as required, or to close one, as shown in Fig. 1, if it is desired to plant but one row at a time.

The seed-roller has upon the end a pinion, $b$, which gears with a corresponding one, $d$, on the hub of the wheels B, by which the requisite motion is given. The seed is dropped in the usual manner from the roller H through the tooth E. This tooth is of peculiar construction, consisting of two tubes, one sliding within the other, and connected together by the spiral spring $e$ and pin $f$, which serves to prevent the other tube, $g$, from turning on the other, and at the same time it is left free to move upward, as the spring is compressed by pressure from beneath, by means of the slot $h$. The front part of the tooth is formed with the usual point, $i$, for entering the ground, and in addition is provided with an adjustable gage-cap, $j$, which consists of a crescent-shaped piece of metal fitting the tooth externally, and having a shank, $l$, which is held between ear-pieces, projecting from the tooth above, by a pin which passes through holes in both. By a series of holes in the shank $l$ the gage may be raised or lowered to regulate the depth of planting by governing the distance which the point of the tooth enters the ground. The spring $e$ acts conjointly with it to produce this result by yielding when the uneven surface of the ground causes a pressure underneath the gage, and thus allowing the tooth to rise. This renders the planting of nearly a uniform depth, which otherwise would vary materially in uneven ground in consequence of the parts where the teeth pass being often higher than the wheel's track, and it enables the teeth to be so set as to plant the depressions equally well, or nearly so, in consequence of the elasticity of the spring allowing the tooth to hang lower than if it were otherwise, while it still works only the depth for which it is set on the mean level of the ground. The tooth is constructed with a hinged joint, $k$, and secured by a slight wooden pin in front, which breaks if the point strikes a stone or other material obstruction and prevents injury to the machine. Another advantage is derived from the spring $e$, which consists in its ability to yield if the point strikes any solid substance, and pass over it without jarring the machine or throwing it out place. The covers F F are provided in a similar manner with springs, which allow them to rise and fall to adapt themselves to the undulating surface of the ground, thus covering to a uniform depth in the same manner that the teeth operate. The packing-rollers G G are pivoted to the frame and act by their weight alone to compress the loose covering of the seed.

For drilling or planting different seeds, other rollers may be readily substituted for the one described, provided with seed-cells adapted to the purpose required.

A tracking-gage, M, is provided, consisting of a rod extending from the end of the axle A, having an arm pivoted thereto bearing a roller, $n$, which rests upon the ground, and leaves a mark where it travels by its slight weight. Being always at a uniform distance from the row which is planted, it leaves a mark in the same direction, which serves as a guide for planting the next row. The length of the rod may be arranged according to the distance desired between the rows, making a very convenient appendage for the purpose. The whole forms a very simple and efficient planting-machine, having the requisites of moderate cost, durability, and compactness.

What I claim as my invention, and desire to secure by Letters Patent, is—

The arrangement of seeding-roller H, gear-wheels $d\ d$, slide-plate I, lever $c$, adjustable teeth E, covers F, and tracking-gage M, constructed and operated substantially as and for the purposes herein set forth.

JAS. P. COONLEY.

Witnesses:
ELLEN WILLOUGHBY,
ANDREW C. HILIKA.